US011134090B1

(12) United States Patent
Swackhamer

(10) Patent No.: US 11,134,090 B1
(45) Date of Patent: Sep. 28, 2021

(54) NETWORK SECURITY ANALYSIS AND MALWARE DETECTION USING MULTIPLE TYPES OF MALWARE INFORMATION

(71) Applicant: Target Brands, Inc., Minneapolis, MN (US)

(72) Inventor: Allen M. Swackhamer, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 296 days.

(21) Appl. No.: 15/997,479

(22) Filed: Jun. 4, 2018

(51) Int. Cl.
*H04L 29/06* (2006.01)
*G06F 16/951* (2019.01)

(52) U.S. Cl.
CPC ........ *H04L 63/1416* (2013.01); *G06F 16/951* (2019.01); *H04L 63/145* (2013.01); *H04L 63/20* (2013.01)

(58) Field of Classification Search
CPC ... H04L 63/1416; H04L 63/20; H04L 63/145; G06F 16/951
See application file for complete search history.

(56) References Cited

U.S. PATENT DOCUMENTS

| 7,529,727 | B2 | 5/2009 | Arning et al. |
| 7,827,611 | B2 | 11/2010 | Kouznetsov et al. |
| 8,635,694 | B2 | 1/2014 | Malyshev et al. |
| 9,021,260 | B1* | 4/2015 | Falk ................. G06F 21/6218 713/165 |
| 9,038,177 | B1 | 5/2015 | Tierney |
| 9,069,957 | B2 | 6/2015 | Tuvell et al. |
| 9,609,011 | B2 | 3/2017 | Muddu et al. |
| 9,882,929 | B1 | 1/2018 | Ettema et al. |
| 2011/0082878 | A1* | 4/2011 | Nozaki ............... G06F 16/3322 707/769 |
| 2013/0326625 | A1 | 12/2013 | Anderson et al. |
| 2014/0082730 | A1 | 3/2014 | Vashist et al. |
| 2014/0359761 | A1 | 12/2014 | Altman et al. |
| 2015/0244733 | A1 | 8/2015 | Mohaisen et al. |
| 2016/0224676 | A1 | 8/2016 | Miller et al. |
| 2016/0314298 | A1 | 10/2016 | Martin |
| 2016/0371339 | A1* | 12/2016 | Paddon ............... G06F 16/2425 |
| 2017/0063888 | A1 | 3/2017 | Moddu et al. |
| 2017/0244735 | A1 | 8/2017 | Visbal et al. |
| 2017/0251003 | A1 | 8/2017 | Rostami-Hesarsorkh et al. |

(Continued)

OTHER PUBLICATIONS

U.S. Appl. No. 15/997,437, filed Jun. 4, 2018, Swackhamer.

(Continued)

*Primary Examiner* — Daniel B Potratz
*Assistant Examiner* — Wansik You
(74) *Attorney, Agent, or Firm* — Fish & Richardson P.C.

(57) ABSTRACT

A static information pipeline is configured to generate formatted static data recording information about malware generated during static analyses of malware. A dynamic information pipeline is configured to generate formatted dynamic data recording information about malware generated during dynamic analyses of malware performed within a network to be protected by the system. A datastore is configured to receive and store the formatted static data; receive and store the formatted dynamic data; generate indices that link stored formatted static data and stored formatted dynamic data that share similar properties; and respond to queries using the indices.

16 Claims, 6 Drawing Sheets

(56) References Cited

U.S. PATENT DOCUMENTS

| | | | |
|---|---|---|---|
| 2017/0286671 A1 | 10/2017 | Chari et al. | |
| 2019/0028508 A1 | 1/2019 | Jeng | |
| 2019/0095510 A1* | 3/2019 | Cruise | G06F 11/3452 |

OTHER PUBLICATIONS

U.S. Appl. No. 15/997,455, filed Jun. 4, 2018, Swackhamer.

Aws.amazon.cpm' [online] Denney. G., "How to Visualize and Refine Your Network's Security by Adding Security Group IDs to Your VPC Flow Logs," May 3, 2017, Retrieved Jul. 21, 2017, Retrieved online: URL <https://aws.amazon.com/blogs/security/how-to-visualize-and-refine-your-networks-security-by-adding-security-group-ids-to-your-vpc-flow-logs/>, 18 pages.

Elastic.co' [online] Paquette. M., "Using Machine Learning and Elasticsearch for Security Analytics: A Deep Dive," May 17, 2017, Retrieved Jul. 21, 2017, Retrieved online: URL <https://www.elastic.co/blog/using-machine-learning-and-elasticsearch-for-security-analytics-deep-dive>, 9 pages.

Elastic.co' [online] Smith. T., "Integrating Bro IDS with the elastic stack," Mar. 17, 2016, Retrieved Jul. 21, 2017, Retrieved online: URL <https://www.elastic.co/blog/bro-ids-elastic-stack>, 11 pages.

gartner.com' [online] Chuvakin. A., "How to Make Better Threat Intelligence Out of Threat Intelligence Data?," Feb. 19, 2014, Retrieved Aug. 1, 2018, Retrieved Online: URL <https://blogs.gartner.com/anton-chuvakin/2014/02/19/how-to-make-better-threat-intelligence-out-of-threat-intelligence-data/>, 4 pages.

splunk.com' [online] Patel. B., "Enriching threat feeds with WHOIS information,"May 2, 2016, Retrieved Aug. 1, 2018, Retrieved Online: URL <https://www.splunk.com/blog/2016/05/02/enriching-threat-feeds-with-whois-information-splunk.html>, 9 pages.

Svajcer. V., "Building a malware lab in the age of big data," *Virus Bulletin Conference.*, Sep. 2015, 12 pages.

symantec.com' [online] "Data Enrichment," Retrieved Aug. 1, 2018, Retrieved Online: URL <https://origin-symwisedownload.symantec.com/resources/webguides/security_analytics/7.2/platform_webguide/desktop/ENG/Data_Enrichment/Providers/_enrichment_providers.htm>, 4 pages.

Wolff and Chisholm., "High dimensional visualization of malware families," *RSA Conference.*, Jul. 22-24, 2015, 34 pages.

\* cited by examiner

NETWORK SECURITY ANALYSIS AND MALWARE DETECTION USING MULTIPLE TYPES OF MALWARE INFORMATION The present document generally relates to computer network security.

BACKGROUND

Computer networks include hardware and software that allow nodes on the network to share data with other nodes. Network security includes policies, practices, and devices adopted to prevent and monitor unwanted access, misuse, modification, or attacks on computer networks and network-accessible resources. Malware includes software that preforms malicious actions on one or more nodes within a network, such as software with malicious code that is executed/interpreted by nodes within a network. Malware can expose not only the machine that is executing/interpreting the malicious code to vulnerabilities (e.g., cause the machine to download more malicious code, cause machine to transmit sensitive information to an external system/computer, cause machine to destroy/encrypt data stored on the machine), but it can expose other nodes within the network to malicious attacks. For example, nodes within a network may trust communications and instructions from other nodes within the network. However, once compromised, nodes may not be able to readily differentiate between secure (uncompromised) nodes and compromised nodes running malicious code. Detecting and preventing malware within a network is a constant challenge as software running on devices is constantly changing, creating possible new security vulnerabilities, and as malware evolves in attempts to exploit those vulnerabilities.

SUMMARY

This document generally describes computer systems, processes, program products, and devices for more accurately and effectively cataloging and classifying malware encountered by a network security system. Information about malware can come, generally, in two forms. The first example form is static information about the malware. This includes information that can be learned or recorded without executing the malware and can include information like a fingerprint (e.g., an MD5 hash), a file size, or a compiled time-stamp. The second example form of information about the malware is dynamic information. This includes information learned or recorded based on an execution/interpretation of the malware. For example, the malware may be executed within a controlled computing environment (e.g., sandboxed environment) that is set up to record actions taken by the malware without exposing other nodes or resources within a network to vulnerabilities. These recorded actions can include the operations taken by the malware, files or directories accessed, and network addresses accessed by the malware.

The static and dynamic information can be combined (e.g., loaded into a single database) so that correspondences, correlations, and other inferences may be identified between different examples of malware. For example, a security analyst may decide to investigate a particular piece of malware to draw inferences about the malware, such as the source of the malware (e.g., author, country of origin), the vulnerability being exploited by the malware (e.g., application under attack, network node with vulnerability), and to identify other similar types of malware. To do this, the security analyst can search the database for an entry for the particular piece of malware, which can provide rudimentary information about the malware. To enhance the search and analysis, the security analyst can then "pivot" to other malware and along other data dimensions based on some of the data associated the malware. As used here, this pivot is the act of selecting some of the data related to the malware and searching for other malware that is the same or similar in those areas. Pivoting can be performed automatically as a way to enhance malware analysis, such as performing multiple follow-up queries based on search results and collating the results into a unified collection of information.

For instance, malware creators can intentionally try to obfuscate malware attacks using different code portions to exploit the same vulnerabilities on a network node—making identifying connections/commonalities between malware attacks challenging. However, if connections/commonalities can be more effectively identified, malware can be more accurately identified and blocked even though the specific malware instance may not have been previously known (e.g., identify code as malicious based on connection/commonalities with previously known malware instances even though code has never been encountered before). This can lead to more proactive malware identification and blocking, which can prevent malware before it is ever executed/interpreted—transforming network security from being reactive (responding to malware attacks that have already exploited vulnerabilities) to being proactive (preventing possible malware attacks before they have started/exploited a vulnerability).

In one example, the security analyst may learn that a new malware has attacked a network that the security analyst is protecting. Wanting to learn more about the malware, the security analyst may query the database for the data related to the malware. The security analyst can be presented with both static and dynamic information about the malware. The system or the security analyst may identify three or four data fields to pivot on, and the system can find all other malware entries that have the same or similar values in those fields. For example, the system or security analyst may pivot on the compile timestamp, the command-and-control domain, and the source IP geolocation. This combination includes a mix of static and dynamic data. In response, the system can provide the security analyst with a list of other malware known to have the same compile timestamp, command-and-control domain, and source IP geolocation.

In some implementations, systems for creation of a database can include a static information pipeline configured to generate formatted static data, the formatted static data being formatted according to a first data format that is associated with static data related to malware, the formatted static data recording information about malware generated during static analyses of malware performed outside of a network to be protected by the system. The systems include a dynamic information pipeline configured to generate formatted dynamic data, the formatted dynamic data being formatted according to a second data format different than the first data format, the second data format being associated with dynamic data related to malware, the formatted dynamic data recording information about malware generated during dynamic analyses of malware performed within a network to be protected by the system. The systems include a datastore configured to receive and store the formatted static data; receive and store the formatted dynamic data; generate indices that link stored formatted static data and stored formatted dynamic data that share similar properties; receive a first query; select, using the indices, first response data for the first query from the stored formatted static data and from the stored formatted dynamic data; return a first response to the first query comprising the first response data; after returning the first response, receive a second query that contains, as a search parameter, a subset of the first response data; select, using the indices and based on the search parameter, second response data for the second query from the stored formatted static data and from the stored formatted dynamic data; and return a second response to the second query comprising the second response data.

In some implementations, methods performed by data processing apparatuses can include receiving and storing formatted static data from a static information pipeline configured to generate the formatted static data, the formatted static data being formatted according to a first data format that is associated with static data related to malware, the formatted static data recording information about malware generated during static analyses of malware performed outside of a network to be protected; receive and store formatted dynamic data from a dynamic information pipeline configured to generate the formatted dynamic data, the formatted dynamic data being formatted according to a second data format different than the first data format, the second data format being associated with dynamic data related to malware, the formatted dynamic data recording information about malware generated during dynamic analyses of malware performed within a network to be protected; generate indices that link stored formatted static data and stored formatted dynamic data that share similar properties; receiving a first query; selecting, using the indices, first response data for the first query from the stored formatted static data and from the stored formatted dynamic data; returning a first response to the first query comprising the first response data; after returning the first response, receiving a second query that contains, as a search parameter, a subset of the first response data; selecting, using the indices and based on the search parameter, second response data for the second query from the stored formatted static data and from the stored formatted dynamic data; and returning a second response to the second query comprising the second response data.

In some implementations, computer storage media encoded with computer program instructions that, when executed by one or more processors, cause a computer device to perform operations including receiving and storing formatted static data from a static information pipeline configured to generate the formatted static data, the formatted static data being formatted according to a first data format that is associated with static data related to malware, the formatted static data recording information about malware generated during static analyses of malware performed outside of a network to be protected; receive and store formatted dynamic data from a dynamic information pipeline configured to generate the formatted dynamic data, the formatted dynamic data being formatted according to a second data format different than the first data format, the second data format being associated with dynamic data related to malware, the formatted dynamic data recording information about malware generated during dynamic analyses of malware performed within a network to be protected; generate indices that link stored formatted static data and stored formatted dynamic data that share similar properties; receiving a first query; selecting, using the indices, first response data for the first query from the stored formatted static data and from the stored formatted dynamic data; returning a first response to the first query comprising the first response data; after returning the first response, receiving a second query that contains, as a search parameter, a subset of the first response data; selecting, using the indices and based on the search parameter, second response data for the second query from the stored formatted static data and from the stored formatted dynamic data; and returning a second response to the second query comprising the second response data.

Implementations can optionally include any, all, or none of the elements described above or the elements described in further detail below. Formatted static data further records information about malware generated during static analyses of malware performed inside of a network to be protected. The first data format comprises a first plurality of fields including a particular subset of fields; and the second data format comprises a second plurality of fields that is different from the first plurality of fields, wherein the second plurality of fields also includes the particular subset of fields. The indices are built on the particular subset of fields stored by the stored formatted static data and the stored formatted dynamic data. The first query is a query to search on at least some of the particular subset of fields; the subset of the first response data used as the search parameter of the second query is different than the particular subset of fields. The dynamic analyses of malware performed within a network to be protected comprises: loading malware into a sandbox environment configured to interrogate malware by executing the malware one or more times and recording the results in testing logs; responsive to loading the malware into the sandbox environment, accessing the testing logs; formatting information in the testing logs into the second data format. The dynamic analyses of malware performed within a network comprises: identifying a malicious execution of malware on a machine on the network to be protected by the system; responsive to identifying the malicious execution, accessing execution logs recording events related to the malicious execution; and formatting information in the execution logs into the second data format. The dynamic analyses of malware performed within a network comprises: identifying an attack on the network with malware; responsive to identifying the attack on the network with malware, accessing security logs recording events related to the attack; and formatting information in the security logs into the second data format. The first response data comprises a plurality of entries, each entry comprising a plurality of records; the subset of the first response data used as the search parameter is some, but not all, of the plurality of records of the entries of the plurality of entries of the first response data. The first response data comprises a plurality of entries, each entry comprising a plurality of records; and the second response data comprises a second plurality of records, at least some of the second plurality of records not included in the first plurality of records such that the second response returns information that was not included in the first response.

The systems, devices, program products, and processes described throughout this document can, in some instances, provide one or more of the following advantages. Computer network security can be improved. For example, the technology of computer and network security can be improved. Disparate pieces of information can be more easily and more efficiently discovered—permitting a shift from reactive malware detection to proactive malware prevention. Data in a database related to similar events can be found and used as the basis for a new search in a way that exposes relevant information to a user that is attempting to search through a large amount of data.

Other features, aspects and potential advantages will be apparent from the accompanying description and figures.

DESCRIPTION OF DRAWINGS

Like reference symbols in the various drawings indicate like elements

DETAILED DESCRIPTION

Systems and databases can be used to generate and store data related to malware for use by security systems and actors that are protecting a network or other computing resource. Such a database can collect information from two pipelines, with one pipeline providing static data and another pipeline providing dynamic data. The static data can include information learned about malware through static analysis while the dynamic data can include information learned about malware through dynamic analysis.

Such a database can be built to include indices correlate the static data with the dynamic data (and vice versa). For example, some malware may be subjected to static analysis by one party. Then, in an unrelated analysis, the same or similar malware may be subjected to a dynamic analysis by another party. Even with access to streams of static and dynamic data about many types of malware, it is difficult to match the static and dynamic data for a particular piece of malware. This document describes a database system that is designed to allow a user to draw this data together through the use of indices and search queries.

For example, consider an example piece of malware. This malware may be discovered and analyzed by a third party security group that generates static data about malware. This data can be added to the third party's data feed that contains data about many types of malware. At a later time, a security analyst may discover that there has been an instance of an attempted attack on a network. Unbeknownst to the analyst, this is the same malware that was analyzed by the third party security group. The analyst may make use of technologies described here to use information about the attack to seek out the related static data (if it exists) and to use the mix of static and dynamic data to gain a more holistic understanding of the attack and related malware.

To provide this functionality, the database can enforce data format constraints on the static and the dynamic data. These constraints can include listings of fields that must be included with data about malware. For example, static data may be required to include a malware name, an MD5 hash, a file name, or a unique identifier. Dynamic data may be required to include information such as date of execution, listings of sensitive files accessed, etc. In addition, both static and dynamic data may be required to include the same subset of fields for use in matching static and dynamic data about the same or similar malware. For example, a malware-classification field may be required, with optional values such as Trojan, dropper, file encrypted, etc. Use of this field can allow an index to be built that, for example, indexes all malware of a similar type. This index, along with other database querying, can allow a user to view some data and then quickly access data that may be related to the viewed data.

Figure 1:
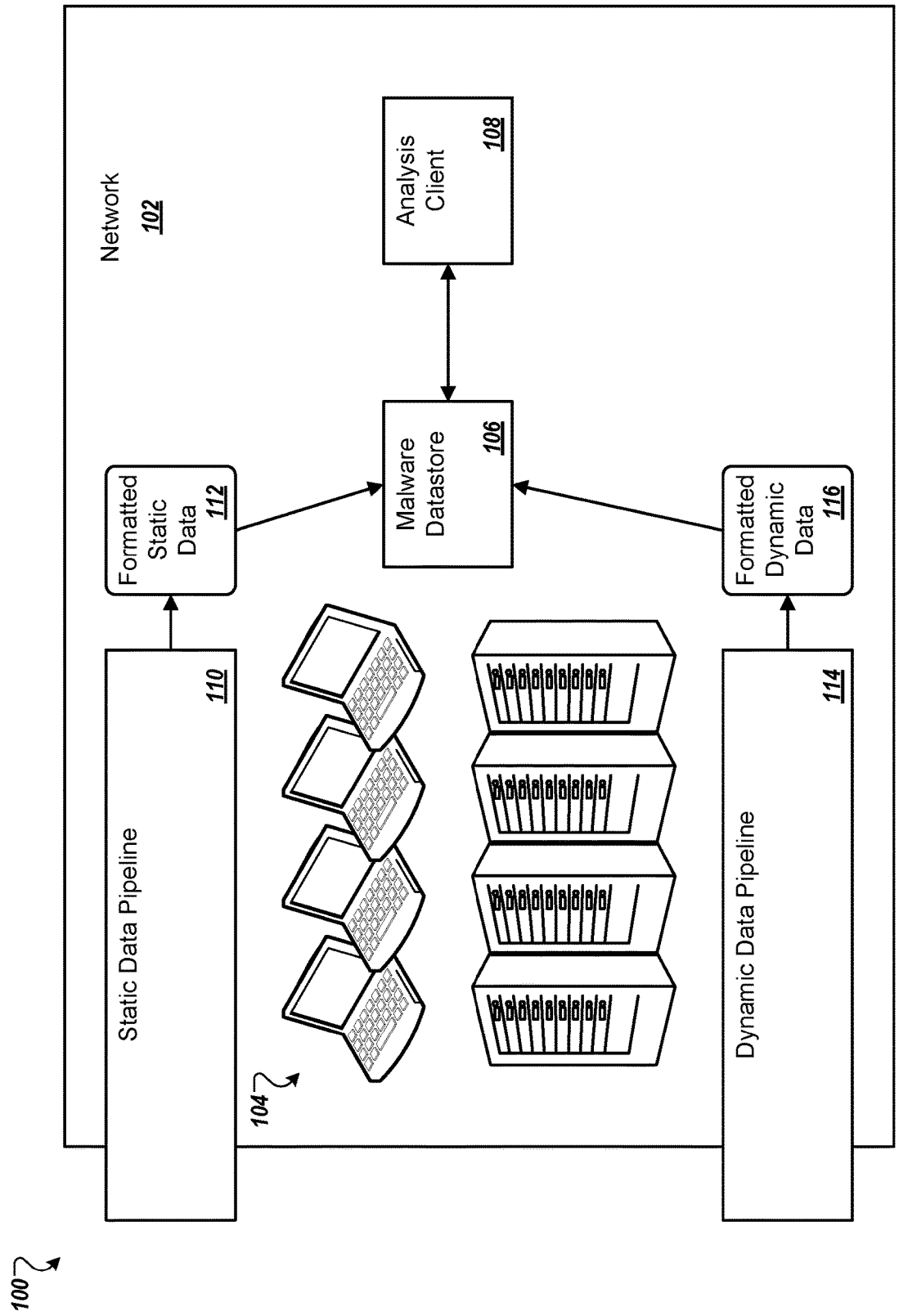
FIG. 1 is a block diagram of an example system for creating a database to record static and dynamic information about malware.

FIG. 1 is a block diagram of an example system 100 for creating a database to record static and dynamic information about malware. In the system 100, a network 102 is being protected by one or more security analysts. The security analysts are users that are tasked with monitoring the security state of the network 102 and to prevent malicious activity like malware execution, data exfiltration, etc.

The network 102 is, for example, a local network, intranet, virtual private network, or other data network used by an organization. The network 102 can include networking hardware such as cables, wireless access points, routers, gateways, firewalls, etc., that work together to allow resident machines 104 to communicate with other resident machines 104 and with computing resources outside of the network 102. The resident machines 104 can include, but are not limited to, personal computers, servers, and mobile devices.

Operations of the network 102 and resident machines 104 may come under attack from malicious actors—users and/or automated services that seek to exploit computing resources they do not own or have authorization to use. The security analysts can stop or attempt to stop these attacks through security countermeasures. These security countermeasures can include anti-malware applications running on the resident machines 104, edge security such as firewalls or gateway sandboxes, and behavior monitoring of the resident machines 104. A malware datastore 106 can be used to store information about malware, malware attacks, and related security incidents. The security analysts can use an analysis client 108 to query contents of the malware datastore 106 in order to search for correspondences, correlations, and other inferences between malware, malware attacks, etc.

To populate the malware datastore 106, the network 102 can use a static data pipeline 110 and a dynamic data pipeline 114 to generate formatted static data 112 and formatted dynamic data 116, respectively. Generally speaking, static data refers to data about malware that is created during static analysis of malware in which the malware is not executed. This information can include, for example, a hash of a file, a file name, a date first encountered, a compile-time stamp, etc. Dynamic data refers to data about malware that is created with execution of the malware. This information can include, for example, behavior signatures, files or network resources read or written to, behavior classifications, counter-security measures, etc.

The static data pipeline 110 collects, aggregates, and formats static data from one or more sources to create formatted static data 112. This may include, for example, collecting data from one or more external security vendors and one or more sources within the network 102. This data may take different format depending on the source of the static data, and the static data pipeline can reformat the data according to a predetermined data format to create the formatted static data 112. In this way, all of the static data, regardless of the source, can be made to conform to a single format.

The dynamic data pipeline 114 collects, aggregates, and formats dynamic data from one or more sources to create formatted dynamic data 114. This may include, for example, collecting data from one or more external security vendors and one or more sources within the network 102. This data may take different format depending on the source of the dynamic data, and the dynamic data pipeline can reformat the data according to a predetermined data format to create the formatted 116. In this way, all of the static and data, regardless of source, can be made to conform to a single format.

The static and dynamic formats may be different. For example, each format may list a collection of fields that must be in each record, but these fields may be different for the two different types of data. This may be due, for example, to the different types of fields that are appropriate for static and dynamic data. A subset of the fields may be the same in both formats. For example, a hash is often used to provide a fingerprint or identification value for malware files, and thus the same hash field may be in both formats.

The formatted static data 112 and formatted dynamic data 116 may be continuously created by the static data pipeline and dynamic data pipeline as input to the pipelines become available. As the formatted static data 112 and formatted dynamic data 116 is created, the malware datastore 106 can receive the data and continuously update its contents. Then, as search queries are received from the analysis client 108, the malware datastore 106 can provide up-to-date search results to the analysis client 108.

Figure 2:
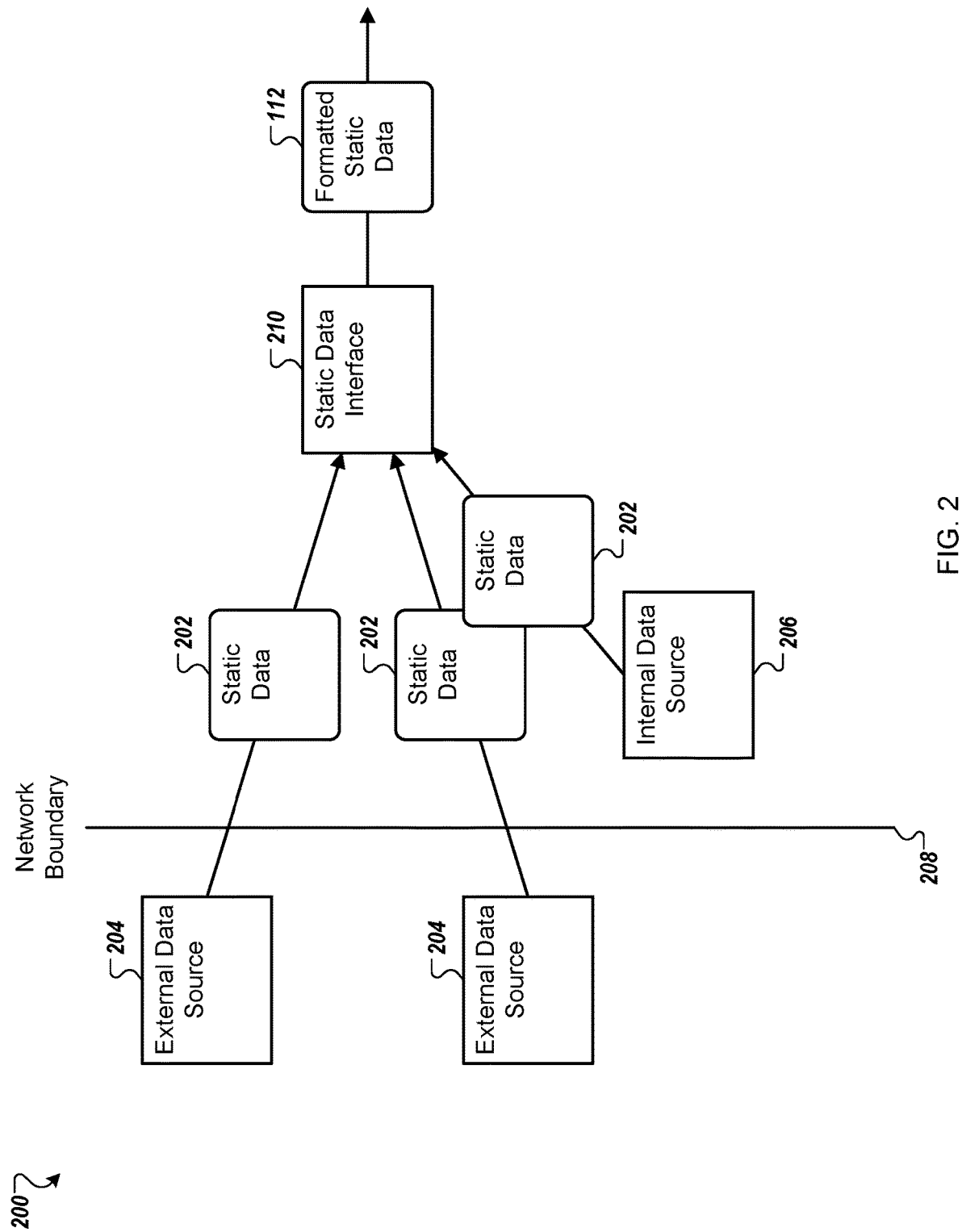
FIG. 2 is a block diagram of an example system for generating formatted static data.

FIG. 2 is a block diagram of an example system 200 for generating formatted static 112 data. The system 200 may be used, for example, to create the static data pipeline 110 discussed above. However, another system or systems may be used to create a static data pipeline 110.

In the system 200, data from various data sources is collected. Generally speaking, these data sources provide subscribers with security information. This security information can include static data 202 about malware, threat intelligence, news items related to security issues, and the like. In some cases, the data sources provide this information for a fee such as a subscription fee. In some cases, the data sources provide this information for free to interested parties. In some cases, the data sources are owned and/or administered by the owner and/or administrator of the network 102 and provide this information in an effort to secure the network 102.

In the system 200, data from various data sources is aggregated. The data sources may be owned and/or administered by different parties. The data sources may provide the data along different communication channels such as email alerts, Rich Site Summary (RSS) feeds, etc. The system 200 can be configured to receive the information along any of these communication channels and then aggregate the information down to one unified communication channel.

In the system 200, data from various sources is formatted into a single common data format. The various data sources may provide their data according to one or more, or no, data formats that may or may not be shared by any other data format. The system 200 can translate data in these disparate formats into a single common format. This single common format may define, for each entry of information, a particular plurality of fields. For incoming data that is in a structured format (e.g., JavaScript Object Notation (JSON) or Extensible Markup Language (XML)) the system 200 can reformat the fields of the incoming data to match the defined format for static data. For incoming data that is unstructured (e.g., natural language) the system 200 can process the unstructured data to extract information needed for the fields of the defined format for static data.

The system 200 includes external data sources 204 and internal data sources 206. The external data sources are situated outside of a network, beyond a network boundary 208. Internal data sources 206 are situated on a network, within the network boundary 208. The network boundary 208 may be, for example, a boundary of the network 102. The external data sources may collect and provide static 202 about malware encountered outside of the network. For example, when a different network is attacked with malware, a security service may perform a static analysis of the malware and provide associated static data 202 to the system 200 as well as many other networks that subscribe to the security service. The internal data source 206 may run static analysis on malware discovered within the network boundary 208, for example malware that attacks resident machine 104.

Each of the external data sources 204 and the internal data source 206 can provide static data 202 to a static data interface 210. The static data 202 may come into the static data interface 210 along one or more different communication channels and formatted according to one or more different formats. As such, the static data interface 210 can be configured to receive data along different communication channels. The static data interface 210 can also be configured to reformat the static data 202 into a formatted static data 112 such that all the formatted static data 112 conforms to a single format. The formatted static data 112 can include information about malware generated during static analyses of malware performed outside of a network to be protected by the system, such as from external data sources 204. The formatted static data 112 can also or alternatively include information about malware generated during static analyses of malware performed inside of the network to be protected by the system, such as from internal data source 206.

Although a particular number and types of elements are shown in the system 200, it will be understood that different numbers and types of elements may be used to create the same or similar results. For example, more or fewer external data sources 204 and/or internal data sources 206 may be used, including no such information sources internal to the network or external to the network. Some of the static data 202 may come into the static data interface 210 already formatted according to the data format used by the formatted static data 112. In addition to the data format used by the formatted static data 112, some of the data may also be formatted according to one or more other data formats. Each element may be made of one or more sub-elements. For example, that static data interface 210 may include an input-module for each communication channel along which static data 202 comes in. The static data interface 210 may include one or more translation modules for translating different static data 202 into the formatted static data 112.

Figure 3:
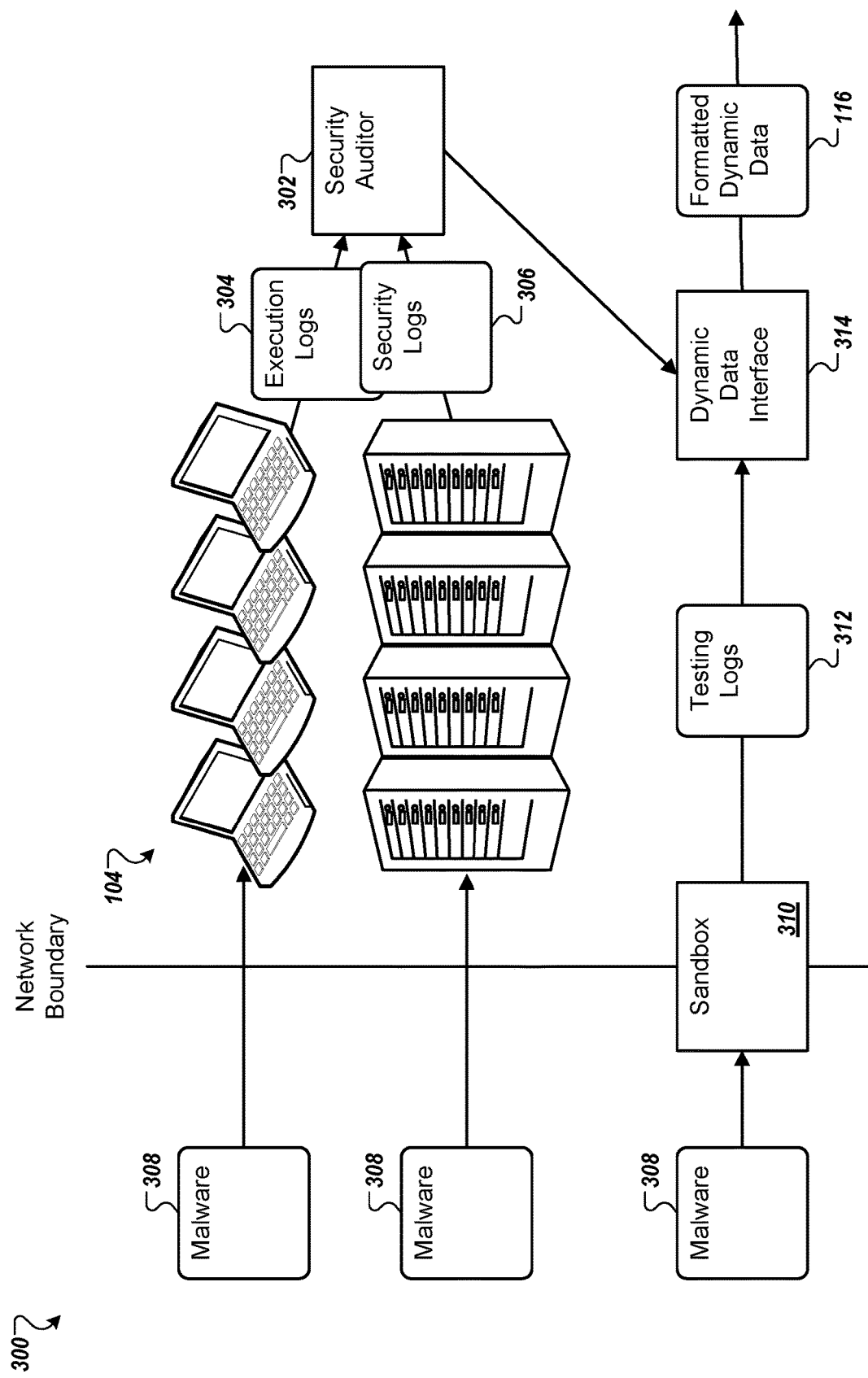
FIG. 3 is a block diagram of an example system for generating formatted dynamic data.

FIG. 3 is a block diagram of an example system 300 for generating formatted dynamic data 116. The system 300 may be used, for example, to create the dynamic data pipeline 114 discussed above. However, another system or systems may be used to create a dynamic data pipeline 116.

In the system 300, data from various data sources is collected. Generally speaking, these data sources provide information about the execution of applications, including or specifically malware applications. Execution includes, but is not limited to, the execution of binary files, interpretation of scrips, running macros, or the like. In some cases, these executions may be initiated specifically for the gathering of security information. In some cases, these executions may be initiated intentionally or accidentally but without intent to execute malicious behavior in malware. That is to say, the malware may be executed on purpose for security reasons, or by accident in the normal course of operation.

A security auditor 302 can operate to audit and enforce security policies of a network. For example, the security auditor 302 can provide a security analyst with a user interface to review activities within the network, schedule security tasks, etc. The security auditor can access logs from the resident machines 104 in order to gain access to information showing activities that the resident machines 104 have undertaken and/or are undertaking.

The security auditor 302 can access execution logs 304 from the resident machines 104. Execution logs 304 can contain information identifying execution of the resident machines 104. This execution can include malicious execution of malware 308 on resident machines 104. For example, the execution logs 304 may include information about access attempts to read data from hard disks, about data sent outside of the network boundary 208, etc.

In some cases, the security auditor 302 can examine the execution logs 304 in response to identifying the malicious execution. For example, a resident machine 104 can generate a security warning when an anti-malware application discovers a malware attack on itself. In another example, the security auditor 302 may sniff network traffic an identify communication indicative of a malware execution. In another example, the security auditor 302 can parse execution logs 304 and identify evidence of malicious execution within the execution logs 304.

Responsive to identifying the malicious execution, the security auditor 302 can access the execution logs 304 recording events related to the malicious execution. For example, the security auditor 302 can send a request to the resident machines 104 for the execution logs 304. For example, the security auditor 302 can receive execution logs 302 on a regular basis and then access the execution logs 302 from storage in response to identifying the malicious executions. In some cases, the resident machines 104 send, and/or the security auditor 302 can request, the execution logs 304 for other reasons or on other schedules.

The security auditor 302 can access security logs 306 from the resident machines 104. Security logs 306 can contain information identifying an attack on the network with malware 308. For example, the malware 308 may gain ingress onto a resident machine 104 on the network and be detected by one or more security countermeasures of the resident machine 104 or another system on the network. This may include, for example, a macro embedded within a document being detected before being loaded, a network sniffer identifying unexpected network traffic, or a monitor application identifying a failed unauthorized access of a sensitive data file. The security auditor 302 may make this identification, or receive a notification from another system that such an identification has been made.

Responsive to identifying the attack on the network with malware 308, the security auditor 302 can access security logs recording events related to the attack. For example, the security auditor 302 can send a request to the resident machines 104 for the security logs 306. For example, the security auditor 302 can receive security logs 306 on a regular basis and then access the security logs 306 from storage in response to identifying the attack. In some cases, the resident machines 104 send, and/or the security auditor 302 can request, the execution logs 304 for other reasons or on other schedules.

In general, identification of execution of malware involves identifying execution or attempted execution of malware, regardless of the cause of the execution. Identification of an attack, on the other hand, involves identification of actions taken to damage the network or place malware on the network. This can include communications containing malware, infiltration of data, impersonation of authorized users, etc.

The network can use edge protection schemes to prevent malware 308 or an attack from entering crossing the network boundary 208. For example, a sandbox 310 may be positioned on the network boundary 208 for the purposes of testing data as the data passes through the network boundary 208. For example, gateways of the network can receive messages with testable data and route the messages to the sandbox 310. The sandbox 310 can load data of the message into a sandboxed environment to test, one or more times, the behavior of the data and report back a result of the test. The network gateway can then decide to drop the message or pass the messages. In some cases, the sandbox 310 is operated in a device physically present in the same geographic location as the network gateway. In some cases, the sandbox 310 is a service provided by a third party provider with no physical presence with the gateway.

A dynamic data interface 314 can access testing logs 312 that contain the results of the tests by the sandbox 310. For example, responsive to the loading of the malware 308 into the sandbox environment, the dynamic data interface 314 can access the testing logs 312. For example, the dynamic data interface 314 can send a request to the sandbox 310 for the testing logs 312. For example, the dynamic data interface 314 can receive testing logs 312 on a regular basis and then access the testing logs 312 from storage in response to loading malware 308 into the sandbox. In some cases, the sandbox 310 can send, and/or the dynamic data interface 314 can request, the testing logs 312 for other reasons or on other schedules.

The dynamic data interface 314 can receive information related to dynamic testing of malware 308. The dynamic data may come into the dynamic data interface 314 along one or more different communication channels and formatted according to one or more different formats. As such, the dynamic data interface 314 can be configured to receive data along different communication channels. The dynamic data interface 314 can also be configured to reformat the incoming into a formatted dynamic data 116 such that all the formatted dynamic data 116 conforms to a single format. The formatted dynamic data 116 can include information about malware generated during dynamic analyses of malware performed outside of a network to be protected by the system. The formatted dynamic data 116 can also or alternatively include information about malware generated during dynamic analyses of malware performed inside of the network to be protected by the system.

Figure 4:
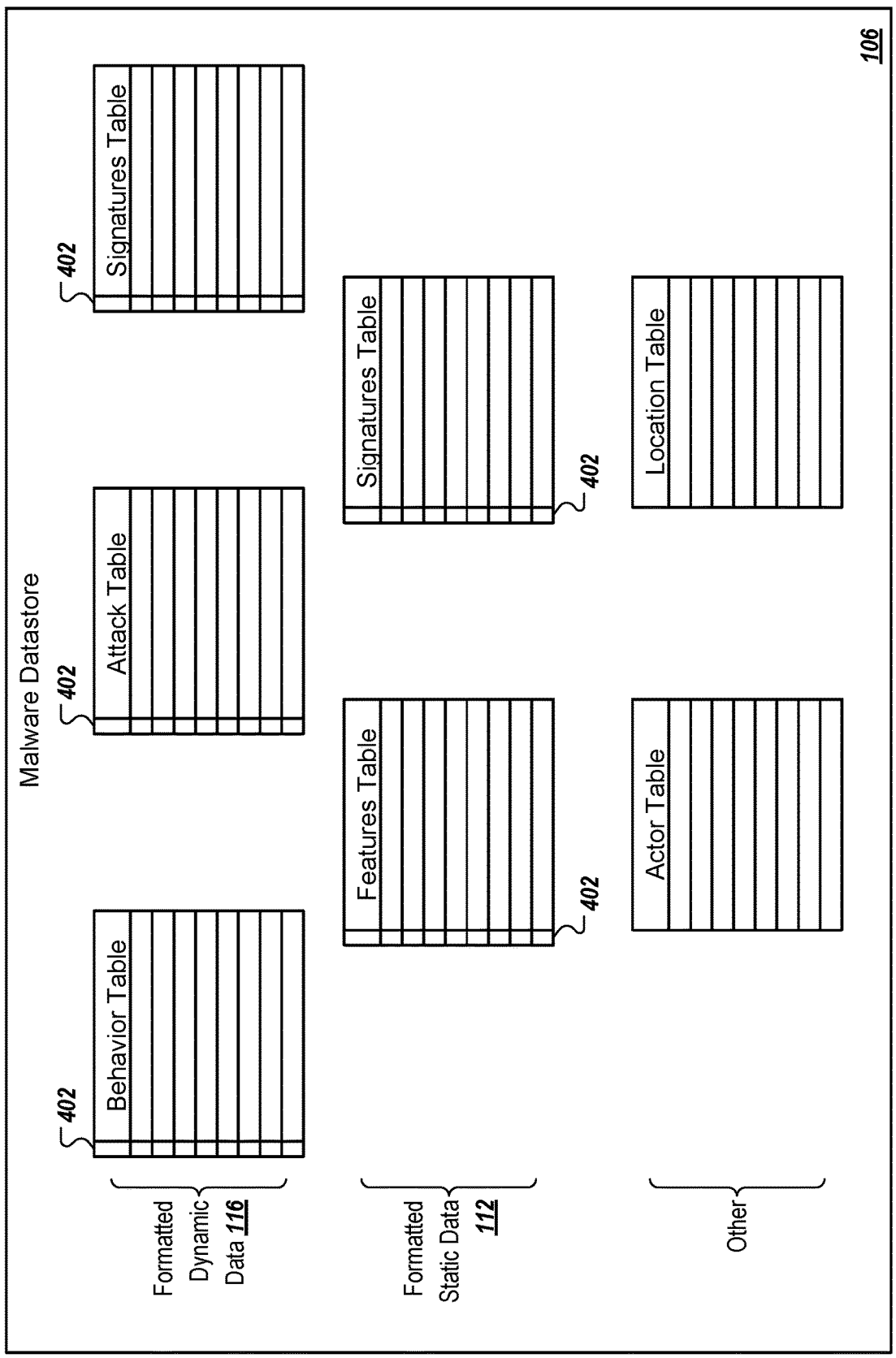
FIG. 4 is a schematic diagram of an example datastore for storing information about malware.

FIG. 4 is a schematic diagram of an example datastore 106 for storing information about malware. The malware datastore 106 can store the formatted static data 112, the formatted dynamic data 116, and other data for future use. For example, the malware datastore 106 can provide access to the stored data to clients such as the analysis client 108.

The malware database can store the formatted static data 112, the formatted dynamic data 116 in separated documents such as tables, objects, etc., that each contain one entry per malware entity or event, and each entry contains one or more records. For example, each entry may represent a single test, a single instance of malware, or a single attack.

Each entry of each document in the formatted static data 112 and the formatted dynamic data 116 can include index values 402 that uniquely identify the entry in the document. These indexes might be, for example, a hash of a file, a timestamp that a sandbox test was performed, etc. These index value need not explicitly identify a particular malware. For example, a particular malware may be permutated into a dozen different files each containing different code, thus having different hash values. As such, the index values alone do not identify all entries in a document related to the same malware. Instead, a security analyst can use the analysis client 108 to query the contents of the malware datastore 106 to identify correspondences, correlations, and other inferences from the data.

The index values can be specified in the first data format to which the formatted static data 112 complies and the second data format to which the formatted dynamic data 116 complies. In some cases, the formatted static data 112 and the formatted dynamic data 116 can include some of the same data in the indexes. For example, the first data format can comprise a first plurality of fields including a particular subset of fields. The second data format can comprise a second plurality of fields that is different from the first plurality of fields but that also include the particular subset of fields.

In some cases, the formatted static data 112 and the formatted dynamic data 116 include no similar data in their indexes. For example, the first and second data formats may contain no subset of similar records used to create indexes. Further, the different documents in the malware database 106 may in some cases share no data across indexes within the formatted static data 112 and/or within the formatted dynamic data 116. As such, the malware datastore 106 may be implemented as either a relational or non-relational database. In either case though, the indexes may be built and maintained, for example, to improve search speed and efficiency.

Figure 5:
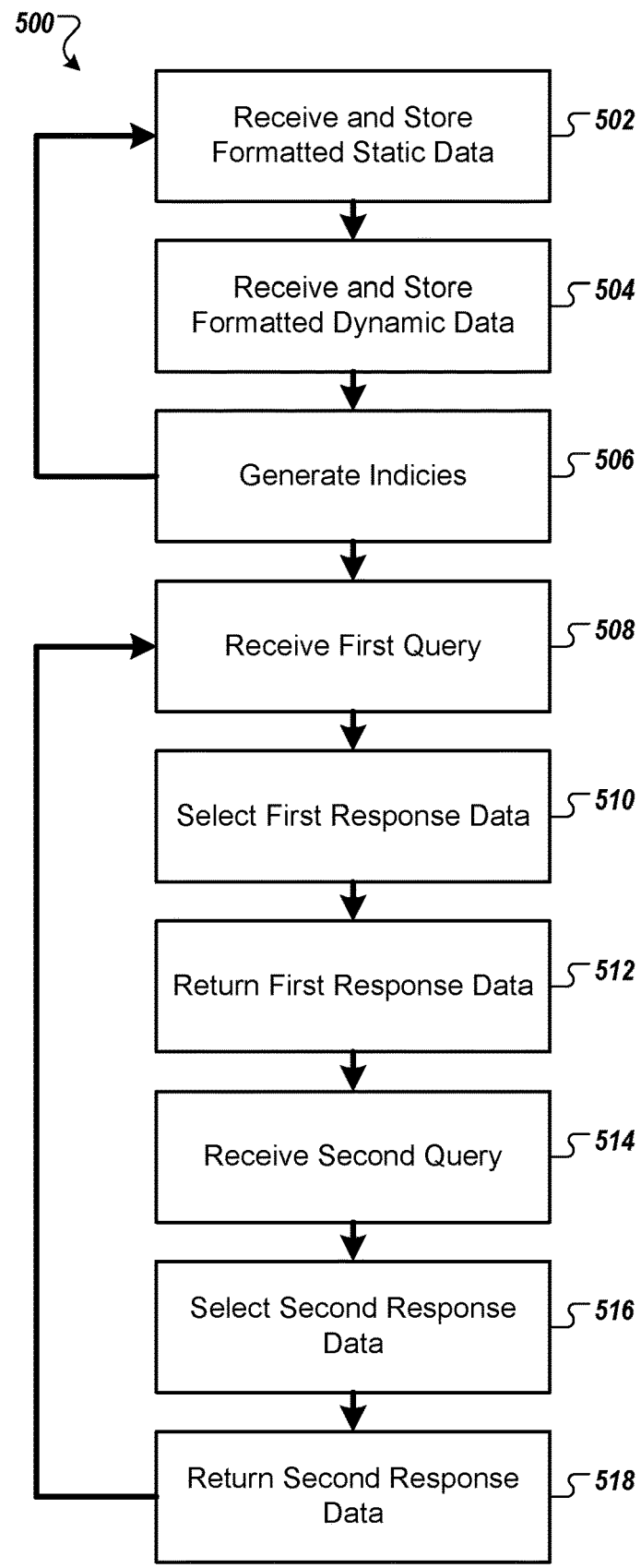
FIG. 5 is a flowchart of an example process for responding to queries about malware.

FIG. 5 is a flowchart of an example process 500 for responding to queries about malware. The process can be used, for example, by the malware datastore 106. As such, the description that follows will be described with reference to elements of the system 100. However, a different number, type, and configuration of elements can be used to perform the process 500 and/or a similar process.

In the process 500, the malware datastore 106 builds a set of data related to malware and malware attacks. Initially, structured data is received and stored. The malware datastore 106 then builds one or more indices that link together data entries that are or have been determined to be related to each other. These indices are then used, in part, to answer queries about data in the datastore 106 so that a security analyst can learn more about security incidents that affect a network the security analyst is analyzing.

Formatted static data is received and stored 502. For example, the malware datastore 106 can receive the formatted static data 112 from the static data pipeline 110. Formatted dynamic data is received and stored 504. For example, the malware datastore 106 can receive the formatted dynamic data 116

Indices that link stored formatted static data and stored formatted dynamic data that share similar properties are generated 506. For example, if various entries in the static and dynamic data contain identical values (e.g., identical hash values) or values near to each other (e.g., timestamp values within minutes of each other), an index can be created that links these entries together. In some cases, the creation of these indices may be user driven. Using information from the malware datastore 106, information from other sources, and their professional skills, a security analyst may determine that various entries in the malware datastore 106 are linked in some way. For example, malware entering the network over the course of weeks, but all with the same target and with file encryption behavior may be noticed by the security analyst. The security analyst may then decide that it is likely that all these entries are related to the same persistent threat. In the user interface of the analysis client 108, the security analyst may flag these entries as all part of a single attack and the malware datastore 106 can build an index linking these entries together.

Receiving data 502-504 and building indices 506 may occur on an ongoing basis. For example, the data from the pipelines can be received as it is available and added when received such that the data in the malware datastore 106 is constantly being updated. Similarly, the indices may be created on an ongoing basis. For indices created by fully-automated process, the indices may be built, for example, on a regular schedule, when new data becomes available, as security analysts create them, etc.

A first query is received 508. For example, an analyst using the analyst client 108 may provide user input that causes the analysis client 108 to issue a query to the malware datastore 106 to search and return some data. This query may take the form of a structured query language including, but not limited to, the Structured Query Language (SQL) or another appropriate language. The query may include one or more search parameters that define the search that should be performed by the malware datastore 106.

Using the indices, first response data for the first query is selected from the stored formatted static data and from the stored formatted dynamic data 510. For example, the malware datastore 106 may engage a query engine to parse the first query to extract the search parameters. The malware datastore 106 can then identify entries that match the search parameters and load those into a memory buffer to prepare them for returning.

To aid in this searching, the malware datastore 106 can use one or more indexes to find entries responsive to the query. For example, a query may search for any malware attacks in the last 24 hours. The malware datastore 106 may identify one attack that has a timestamp within the requested time window. The record for this attack may include, for example, the timestamp, a hash of the file used in the attack, a network identifier of the targeted resident machine 104, and a malware-type field (e.g., dropper). The record may also include data for an index that matches the entry for this this attack to three other entries for attacks performed in the last month. These other attacks may have been identified, for example, based on a similar behavioral signature of the malware found during dynamic execution. Further, these four entries may each reference some entries of static data by way of the index. All of these related entries may be gathered by the malware datastore 106.

A first response for the first query is returned. The first response includes the first response data 512. For example, malware datastore 106 can collect all of the data identified for response and return that to the analysis client 108.

After returning the first response, a second query is received. The second query contains, as a search parameter, a subset of the first response data 514. For example, the security analyst may see the four instances of a dropper being targeted at the same resident machine 104 and become concerned that the network 102 is undergoing a persistent spearphishing attack on a computer used by a user with elevated permissions to some sensitive financial data. In such a case, the security analyst may select a small handful of the records returned and request a search on those records using the values in those records. For example, the second query may ask for instances of malware compiled at or near the same time as the malware used in those for attacks.

Using the indices and based on the search parameter, second response data for the second query is selected from the stored formatted static data and from the stored formatted dynamic data 516. For example, malware datastore 106 may use an index built on compile timestamps to quickly identify other attacks using malware compiled at the same time. A second response to the second query is returned. The second response includes the second response data 518. For example, the malware datastore 106 can return the entries related to the other attacks.

In some cases, the first response data comprises a plurality of entries, each entry comprising a plurality of records and the subset of the first response data used as the search parameter is some, but not all, of the plurality of records of the entries of the plurality of entries of the first response data. As shown in FIG. 4, the malware datastore 106 can store entries in the form of rows of tables. Each of these rows may be made of records stored as cells. The first response can include some entries (i.e. rows). The second query can call for an expanded search in which more and/or different rows are returned.

For example, a security analyst can use the first query to call up an entry about one particular file. The security analyst can see that the response to the query indicates the malware using a command-and-control server the analyst is not familiar with. The security analyst may then use the second query to call up, for example, all other malware that uses that command-and-control server, to see if there is anything to be learned from that group.

In some cases, the first response data comprises a plurality of entries, each entry comprising a plurality of records; and the second response data comprises a second plurality of records, at least some of the second plurality of records not included in the first plurality of records such that the second response returns information that was not included in the first response. For example, to perform the search on the command-and-control server, the security analyst may review the results of the first query. These results, made up of an entry for the file at issue with each entry containing a group of records, can be used as the basis of a second search. In such a case, the analyst may indicate that they wish to execute a search using one record of the entry, the command-and-control record. In addition, the analyst may also limit the search with one or more parameters (e.g., within a time window). These additional limits may be based on the first search results or newly entered by the security analyst.

After the second response is returned, the malware datastore can remain ready to answer more queries, and to receive more formatted data and build more indices. Indeed, the malware datastore 106 is capable of performing various actions simultaneously. For example, if in identifying data responsive to a query, a new correspondence is found, the malware datastore 106 can generate or update an index while preparing response data for the query.

By using the technology described in this document, correspondences found between malware data can be used to increase the search speed and efficiency of the malware datastore 106. This improvement to data storage and retrieval allows for technological improvements when particular domain-specific (i.e. security-type) data is available for use.

Figure 6:
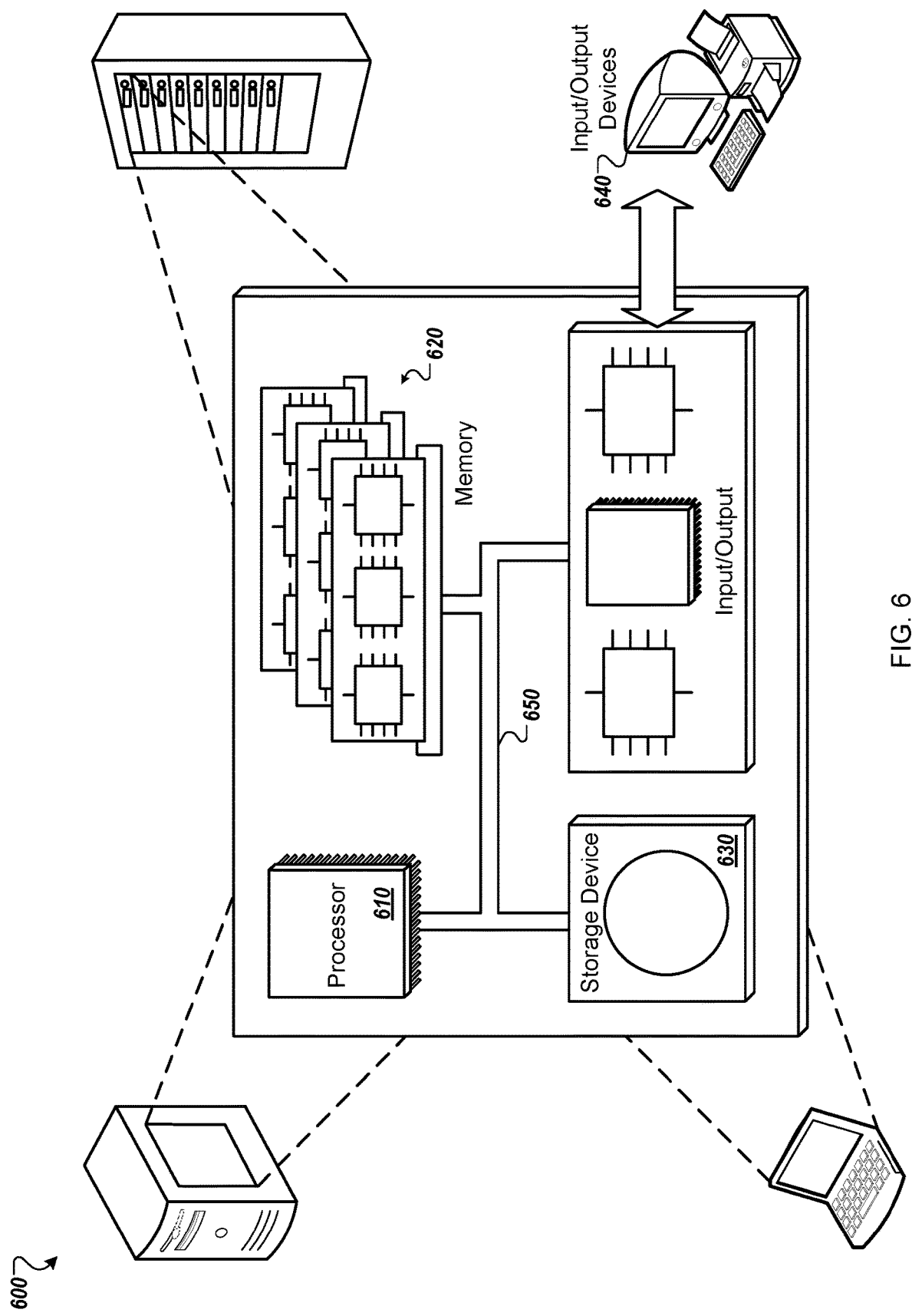
FIG. 6 is a schematic diagram that shows an example of a computing device and a mobile computing device.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system for creation of a database, the system comprising:
   a static information pipeline configured to generate formatted static data, the formatted static data being formatted according to a first data format that is associated with static data related to malware, the formatted static data recording information about malware generated during static analyses of malware performed outside of a network to be protected by the system;
   a dynamic information pipeline configured to generate formatted dynamic data, the formatted dynamic data being formatted according to a second data format different than the first data format, the second data format being associated with dynamic data related to malware, the formatted dynamic data recording information about malware generated during dynamic analyses of malware performed within a network to be protected by the system;
   a datastore configured to:
      receive and store the formatted static data;
      receive and store the formatted dynamic data;
      generate, using a first subset of fields that are common to both the formatted static data and the formatted dynamic data, indices that link stored formatted static data and stored formatted dynamic data that share similar properties;
      receive a first query from a client device;
      select, using the indices, first response data for the first query from the stored formatted static data and from the stored formatted dynamic data, the first response data comprises a plurality of first entries, each first entry comprising a plurality of fields;
      return, to the client device, a first response to the first query comprising the first response data;
      after returning the first response, receive, from the client device, a second query that contains, as a search parameter, a second subset of the first response data, wherein the second query is different from the first query so as to identify additional entries not included in the first response data;
      select, using the indices and based on the search parameter, second response data for the second query from the stored formatted static data and from the stored formatted dynamic data, the second response data comprising i) at least one of the first entries and ii) at least one additional entry not included in the first entries; and
      return, to the client device, a second response to the second query comprising the second response data; and
   the client device, comprising:
      one or more processors; and
      computer memory storing instructions that, when executed by the processors, cause the client device to perform operations comprising:
         receiving user input specifying the first query;
         displaying the first response having a plurality of fields displayed, including at least a dynamic field and a static field;
         receiving user input identifying, out of the fields displayed of the displayed first response, both a dynamic field portion of the first response and a static field portion of the first response, the user input specifying at least one, but not all of the fields displayed;
         generating the second query using the identified dynamic field portion and the identified static field portion as the search parameter such that the second query is different from the first query so as to identify additional entries not included in the first response data; and
         displaying the second response.

2. The system of claim 1, wherein the formatted static data further records information about malware generated during static analyses of malware performed inside of a network to be protected by the system.

3. The system of claim 1, wherein the indices are built on the first subset of fields stored by the stored formatted static data and the stored formatted dynamic data.

4. The system of claim 3, wherein:
   the first query is a query to search on at least some of the first subset of fields;
   the second subset of the first response data used as the search parameter of the second query is different than the first subset of fields.

5. The system of claim 1, wherein the dynamic analyses of malware performed within a network to be protected by the system comprises:
   loading malware into a sandbox environment configured to interrogate malware by executing the malware one or more times and recording the results in testing logs;
   responsive to loading the malware into the sandbox environment, accessing the testing logs;
   formatting information in the testing logs into the second data format.

6. The system of claim 1, wherein the dynamic analyses of malware performed within a network to be protected by the system comprises:

identifying a malicious execution of malware on a machine on the network to be protected by the system;

responsive to identifying the malicious execution, accessing execution logs recording events related to the malicious execution; and formatting information in the execution logs into the second data format.

7. The system of claim 1, wherein the dynamic analyses of malware performed within a network to be protected by the system comprises:

identifying an attack on the network with malware;

responsive to identifying the attack on the network with malware, accessing security logs recording events related to the attack; and formatting information in the security logs into the second data format.

8. A method performed by data processing apparatuses, the method comprising:

receiving and storing formatted static data from a static information pipeline configured to generate the formatted static data, the formatted static data being formatted according to a first data format that is associated with static data related to malware, the formatted static data recording information about malware generated during static analyses of malware performed outside of a network to be protected;

receiving and store formatted dynamic data from a dynamic information pipeline configured to generate the formatted dynamic data, the formatted dynamic data being formatted according to a second data format different than the first data format, the second data format being associated with dynamic data related to malware, the formatted dynamic data recording information about malware generated during dynamic analyses of malware performed within a network to be protected;

generate, using a first subset of fields that are common to both the formatted static data and the formatted dynamic data, indices that link stored formatted static data and stored formatted dynamic data that share similar properties;

receiving a first query from a client device;

selecting, using the indices, first response data for the first query from the stored formatted static data and from the stored formatted dynamic data, the first response data comprises a plurality of first entries, each first entry comprising a plurality of records;

returning, to the client device, a first response to the first query comprising the first response data;

after returning the first response, receiving, from the client device, a second query that contains, as a search parameter, a second subset of the first response data, wherein the second query is different from the first query so as to identify additional entries not included in the first response data;

selecting, using the indices and based on the search parameter, second response data for the second query from the stored formatted static data and from the stored formatted dynamic data, the second response data comprising i) at least one of the first entries and ii) at least one additional entry not included in the first entries; and returning, from the client device, a second response to the second query comprising the second response data;

wherein the client device comprises:

one or more processors; and computer memory storing instructions that, when executed by the processors, cause the client device to perform operations comprising:

receiving user input specifying the first query;

displaying the first response having a plurality of fields displayed, including at least a dynamic field and a static field;

receiving user input identifying, out of the fields displayed of the displayed first response, both a dynamic field portion of the first response and a static field portion of the first response, the user input specifying at least one, but not all of the fields displayed;

generating the second query using the identified dynamic field portion and the identified static field portion as the search parameter such that the second query is different from the first query so as to identify additional entries not included in the first response data; and displaying the second response.

9. The method of claim 8 wherein the formatted static data further records information about malware generated during static analyses of malware performed inside of a network to be protected.

10. The method of claim 8, wherein the indices are built on the first subset of fields stored by the stored formatted static data and the stored formatted dynamic data.

11. The method of claim 10, wherein:

the first query is a query to search on at least some of the first subset of fields;

the second subset of the first response data used as the search parameter of the second query is different than the first subset of fields.

12. The method of claim 8, wherein the dynamic analyses of malware performed within a network to be protected comprises:

loading malware into a sandbox environment configured to interrogate malware by executing the malware one or more times and recording the results in testing logs;

responsive to loading the malware into the sandbox environment, accessing the testing logs;

formatting information in the testing logs into the second data format.

13. The method of claim 8, wherein the dynamic analyses of malware performed within a network comprises:

identifying a malicious execution of malware on a machine on the network to be protected by the system;

responsive to identifying the malicious execution, accessing execution logs recording events related to the malicious execution; and formatting information in the execution logs into the second data format.

14. The method of claim 8, wherein the dynamic analyses of malware performed within a network comprises:

identifying an attack on the network with malware;

responsive to identifying the attack on the network with malware, accessing security logs recording events related to the attack; and formatting information in the security logs into the second data format.

15. The system of claim 1, wherein the number of fields displayed that are identified by the received user input is determined by the user.

16. The method of claim 8, wherein the number of fields displayed that are identified by the received user input is determined by the user.

* * * * *